United States Patent [19]

Bauer et al.

[11] Patent Number: 5,364,905
[45] Date of Patent: Nov. 15, 1994

[54] PROCESS FOR THE IN-SITU FORMATION OF REINFORCING MEMBERS IN AN ELASTOMER AND ELASTOMER MADE THEREBY

[75] Inventors: Richard G. Bauer, Kent; Donald J. Burlett, Wadsworth; Joseph W. Miller, Jr., Fairlawn; Gordon R. Schorr, Uniontown, all of Ohio; Pradeep M. Bapat, Roswell, Ga.

[73] Assignee: The Goodyear Tire & Rubber Company, Akron, Ohio

[21] Appl. No.: 692,338

[22] Filed: Apr. 26, 1991

[51] Int. Cl.$^5$ .............. C08L 55/02; C08L 75/02; C08L 75/04

[52] U.S. Cl. ................. 525/53; 525/92; 525/96; 525/98; 525/130; 525/131; 525/165; 525/177; 525/178; 525/184; 264/211.24

[58] Field of Search ........ 525/131, 130, 165, 178-177, 525/184, 53, 92, 96, 98; 264/211.24; 425/349, 131.1, 132, 133.5

[56] References Cited

U.S. PATENT DOCUMENTS

| | | | |
|---|---|---|---|
| Re. 28,715 | 2/1976 | Stamberger | 521/137 |
| 3,652,468 | 3/1972 | Schwab et al. | 525/130 |
| 4,161,470 | 0/1979 | Calundann | 528/190 |
| 4,250,279 | 0/1981 | Robeson | 525/425 |
| 4,255,296 | 0/1981 | Ogawa et al. | 525/86 |
| 4,257,468 | 0/1981 | Ogawa et al. | 152/374 |
| 4,261,946 | 4/1981 | Goyert | 525/131 |
| 4,328,133 | 0/1982 | Ogawa et al. | 524/505 |
| 4,396,051 | 0/1983 | Ogawa et al. | 151/203 |
| 4,424,306 | 1/1984 | Kitahara et al. | 525/130 |
| 4,438,236 | 0/1984 | Cogswell et al. | 525/165 |
| 4,567,227 | 0/1986 | Kiss | 524/538 |
| 4,691,752 | 0/1987 | Kabe et al. | 152/527 |
| 4,703,086 | 0/1987 | Yamamoto et al. | 525/133 |
| 4,728,698 | 3/1988 | Isayev et al. | 525/439 |
| 5,091,455 | 2/1992 | Blank et al. | 525/131 |
| 5,122,569 | 6/1992 | Scheibelhoffer | 525/66 |
| 5,158,725 | 10/1992 | Handa et al. | 264/40.7 |

FOREIGN PATENT DOCUMENTS

| | | |
|---|---|---|
| 0246732 | of 1987 | European Pat. Off. . |
| 434596 | 6/1991 | European Pat. Off. . |
| 57-47205 | of 1982 | Japan . |
| 62-59665 | 3/1987 | Japan .............. 525/131 |

*Primary Examiner*—John Kight, III
*Assistant Examiner*—R. F. Johnson
*Attorney, Agent, or Firm*—David E. Wheeler

[57] ABSTRACT

A continuous method for the in-situ polymerization of plastic in an elastomeric material in a form suitable for reinforcing the elastomeric material is provided. The method comprises feeding elastomer and a monomer or monomer precursor of a reinforcing material into a mixing device, mixing the elastomer and the monomer or monomer precursor vigorously, initiating polymerization, and causing the monomers to continue to polymerize until the polymer solidifies when the melting point of the polymer produced exceeds the mixing temperature of the elastomer, terminating polymerization.

6 Claims, 8 Drawing Sheets

MICROGRAPH OF 30% POLYUREA/NATSYN PREPARED IN BRABENDER (170° C, DIAMINE FIRST, 20 SEC INTERVALS THROUGHOUT ADDITION) - 10,000X MAGNIFICATION

MICROGRAPH OF 30% POLYUREA/NATSYN PREPARED IN BRABENDER (120° C, DIAMINE FIRST, 20 SEC INTERVALS THROUGHOUT ADDITION) – 10,000X MAGNIFICATION

MICROGRAPH OF 30% POLYUREA/NATSYN PREPARED IN BRABENDER (140°C, DIAMINE FIRST, 20 SEC INTERVALS THROUGHOUT ADDITION) - 10,000X MAGNIFICATION

MICROGRAPH OF 30% POLYUREA/NATSYN PREPARED IN BRABENDER (170°C, DIISOCYANATE FIRST, 20 SEC INTERVALS THROUGHOUT ADDITION)-10,000X MAGNIFICATION

MICROGRAPH OF 30% POLYUREA/NATSYN PREPARED IN EXTRUDER (150°C, DIAMINE FIRST) – 10,000X MAGNIFICATION

MICROGRAPH OF 30% POLYUREA/NATSYN
PREPARED IN EXTRUDER (150°C, DIISOCYANATE
FIRST)-10,000X MAGNIFICATION

PROCESS FOR THE IN-SITU FORMATION OF REINFORCING MEMBERS IN AN ELASTOMER AND ELASTOMER MADE THEREBY

BACKGROUND OF THE INVENTION

The present invention relates to a method for the in-situ formation of reinforcing members in an elastomeric matrix and an elastomeric matrix made thereby.

Those skilled in the art have long understood that the addition of reinforcing materials to an elastomer greatly improves the strength properties of an elastomeric matrix. Difficulties sometimes arise, however, in the mixing of the reinforcing material into the elastomer. Polyaromatic amide fibers, for example (such as Kevlar ®, available from E. I. Dupont Nemours Inc., Wilmington, Del.), are not easily mixed with an elastomer and have a tendency to form "rats' nests" in the mix. Because of this, such fibers are prepared in a masterbatch, which requires four or five passes in a mixer, and in production the masterbatch is mixed with about four times its weight in rubber, which requires another four or five passes in the mixer.

Although the degree of difficulty encountered in mixing some other types of fibers and reinforcing materials into an elastomer is not as great as that encountered for Kevlar, in all cases the mixing procedure is time and labor intensive and represents a considerable portion of the expense of a reinforced elastomeric article.

Part of the difficulty encountered in mixing prior art reinforcing materials into an elastomer relates to the size of the materials. Kevlar, and similar fibers, generally have a length of 0.1 mm to 3 mm and an aspect ratio of 50 to 100. Such fibers are known in the art as macro fibers. Also because of their size, such fibers may detract from the appearance of articles when close to the surface of the article. Because of strength anomalies, large fibers may not be suitable for use in articles which are made having small dimensions and low gauges, and because of their size may be observable in finely defined areas of large articles.

It is known in the art that micro fibers (0.1 micron to 1000 microns in length, with an aspect ratio of 10 to 1000) can be formed in-situ in a polymer matrix. Isayev et al., for example in U.S. Pat. No. 4,728,698 teach the in-situ formation of fibers in a polymer matrix by the addition of a liquid crystal polymer to a base polymer followed by mixing and extrusion.

It is an object of the present invention to include reinforcing materials into an elastomeric matrix substantially in one step, reducing the time and labor needed to provide reinforcement for an elastomeric article. It is also an object of the present invention to control the size and orientation of fiber type reinforcements in such articles whereby such reinforcement can be used in articles having small dimensions and low gauges, and in finely defined areas of large articles.

SUMMARY OF THE INVENTION

A method for the in-situ polymerization of a polymer reinforcing material in an elastomer is provided. The method comprises the steps of feeding an elastomer and monomeric precursors of a reinforcing material into a mixing device, increasing the temperature of the mixture above the melting point of the monomers, mixing the elastomer and the monomers vigorously, and initiating the polymerization of the monomers during the mixing. The monomers continue to polymerize during the mixing until they achieve a polymer chain having a melting point above the mixing temperature, at which point the reinforcing material solidifies, which terminates polymerization. The mixing device used in the method may be a Banbury ® mixer, other mixer, or an extruder, preferably a twin screw extruder. The temperature in the mixing step of the method is carefully controlled at 100°–200° Celsius (212°–392° F.), and the temperature of the mix may be chosen with reference to the materials used and the size and orientation of the reinforcing materials desired. Similarly, when an extruder is used, the screw profile of the extruder may be designed to provide control of the morphology of the reinforcing materials. Optionally, a grafting agent may be employed to chemically bond the elastomer to the reinforcing materials.

Also provided is a reinforced elastomer made according to the method of the invention. The reinforced elastomer is relatively non-hysteretic, has an increased modulus and hardness as compared to a control which is non-reinforced and a control in which polyurea reinforcement was preformed and then incorporated into an elastomer.

DETAILED DESCRIPTION OF THE INVENTION

Figure 1:
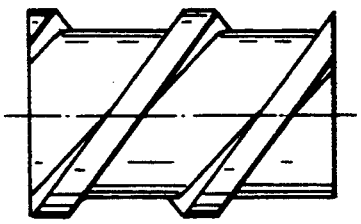
FIG. 1 illustrates an extruder screw element known in the art as a helical screw.

The invention provides a method for the in-situ formation of reinforcing materials in an elastomer matrix. In the method, the precursor of monomers, and/or monomer(s) which are precursors of polymeric reinforcing materials, are added to an elastomer while the elastomer is being mixed vigorously in a Brabender mixer or extruder or a similar mixing device. The precursors and/or monomers polymerize in the mixture until the melting point of the polymer chain formed thereby exceeds the temperature of the elastomer/monomer mixture, at which point the reinforcing material solidifies and polymerization stops. The size of the reinforcing domains and their morphology can be controlled by controlling the temperature of the mixture, by changing the order of addition of precursors to the elastomer, by the speed the reactants are added to the mixture, the speed of the mixing, and the kind of elements used in the mixer. In general, the reinforcing material formed in the method is in the form of particles having a length of 0.1 to 100 microns which may be in domains or in the form of fibrils.

In the method of the invention, the elastomer and monomer precursors are continuously fed into a mixing device and are mixed vigorously in the mixing device. Initiators are continuously added to the mixture downstream of the initial mixing step to initiate polymerization of the monomers of the plastic reinforcing material. Examples of combinations of precursors that can be used are diols and diisocyanates, diols and diamines, and diacids and diamines.

It is desirable to maintain the mixture in the temperature range of 100°–200° Celsius (212°–392° F.). Higher temperatures may scorch or degrade the elastomer if maintained over an extended period of time, and lower temperatures are below the reaction temperature of some precursors or monomers that may be used to provide polymer reinforcement of elastomers. Also, when temperatures in the lower end of the range are used, the domains of reinforcement material will have a lower molecular weight (i.e. be in the small end of the size range) since the melting point at which the polymer solidifies will be lower, indicating a shorter polymer chain.

In the illustrated embodiment, precursors of well known elastomer reinforcing materials, (mainly plastics) such as polyaromatic amides (such as Kevlar), polyesters, polyamides, polyurethanes, polyurea resins, and other condensation polymers may be used. (It is believed that the method may also be used to form liquid crystal micro fibers or short fibers in-situ.) For example, when the desired reinforcing material is a polyaromatic amide, precursors such as aromatic diacid chloride and aromatic diamine may be used. Similarly, when the desired reinforcing material is a polyurea, diisocyanate and diamine precursors may be used. Similar reinforcing materials and their precursors will be apparent to those skilled in the art.

The elastomers used in the method may be any elastomer well characterized in the art. Examples of such elastomers include natural rubber, isoprene rubber, neoprene rubber, SBR (styrene butadiene rubber), ethylene propylene diene monomer (EPDM) rubber, polybutadiene rubber, NBR (acrylonitrile butadiene rubber ) and mixtures thereof. Other suitable elastomers will be apparent to those skilled in the art.

In an illustrated embodiment, it has been found that a twin screw extruder may be particularly applicable for forming reinforcement domains in an elastomeric matrix.

With reference now to FIGS. 1–4, conventional screw elements used in twin screw extruders are illustrated.

Figure 2:
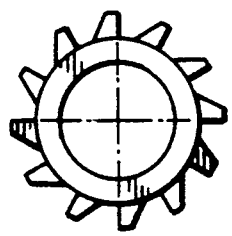
FIGS. 2 and 2a illustrate an extruder screw element known in the art as a mixing gear.
Figure 2A:
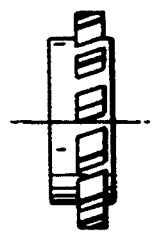
Figure 3:
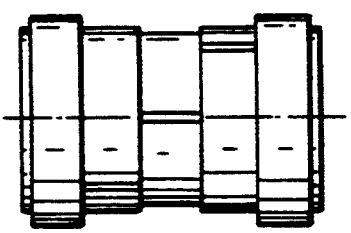
FIG. 3 illustrates an extruder screw element known in the art as a kneader.
Figure 4:
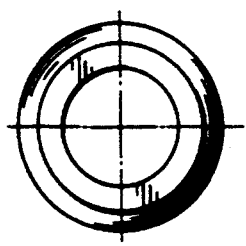
FIGS. 4 and 4a illustrate an extruder screw element known in the art as a blister.
Figure 4A:
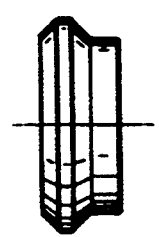

In an embodiment where a co-rotating twin screw extruder is used, screw profiles are established using screw elements that are known in the art in the plastics industry. A typical screw profile comprises a number of helical screws (FIG. 1) which are used primarily to transport the composition components through the extruder barrel, distributive mixing gears (FIGS. 2 and 2a) which provide low shear rearrangement of the components, and dispersive mixing elements (kneaders) (FIG. 3) which provide high shear breakdown of components. An element known as a blister (FIGS. 4 and 4a) optionally may be used to restrict the barrel at specific locations in order to build up the pressure and temperature at specific points in the mixing process.

In a preferred embodiment a twin screw co-rotational extruder with parallel shafts that rotate at identical speeds is used. The center lines of the two shafts are so located as to provide full intermeshing of the elements on the two shafts. For this embodiment, the elements may be chosen such that 20% to 80% provide high shear mixing, 20% to 80% provide redistribution, and 20% to 80% promote axial transportation. Flow restrictors may be placed at any number of locations. The proportions of each type of element has been determined as a percentage of the total length of the extruder. The percentages may also be expressed, for example, as a number of individual screw parts, etc. The elements may further be arranged on the screw shaft or interspersed in a manner that would yield an ideal combination of transport, mixing, redistribution, axial mixing, and throttling for the purpose of obtaining the desired fiber dispersion.

Axial mixing is promoted by the use of non-conjugated screw elements which are lengthwise open and, therefore, permit lengthwise leakage flow patterns. Throttling is provided by blisters that restrict the cross-sectional area for forward material movement. This creates a zone of enhanced residence time just upstream of the blister with resultant enhanced mixing action in this zone.

The extruder temperature may be controlled by a set of electrical heating elements or by circulating the heating and/or cooling fluid through the shafts and/or through cores provided on the barrel itself or in additional contact surfaces. In the illustrated embodiment, a fully intermeshed twin screw extruder is used. By fully intermeshed, it is meant that the two screw profiles in the extruder have complementary elements and that there is intermeshing of the elements.

Figure 5:
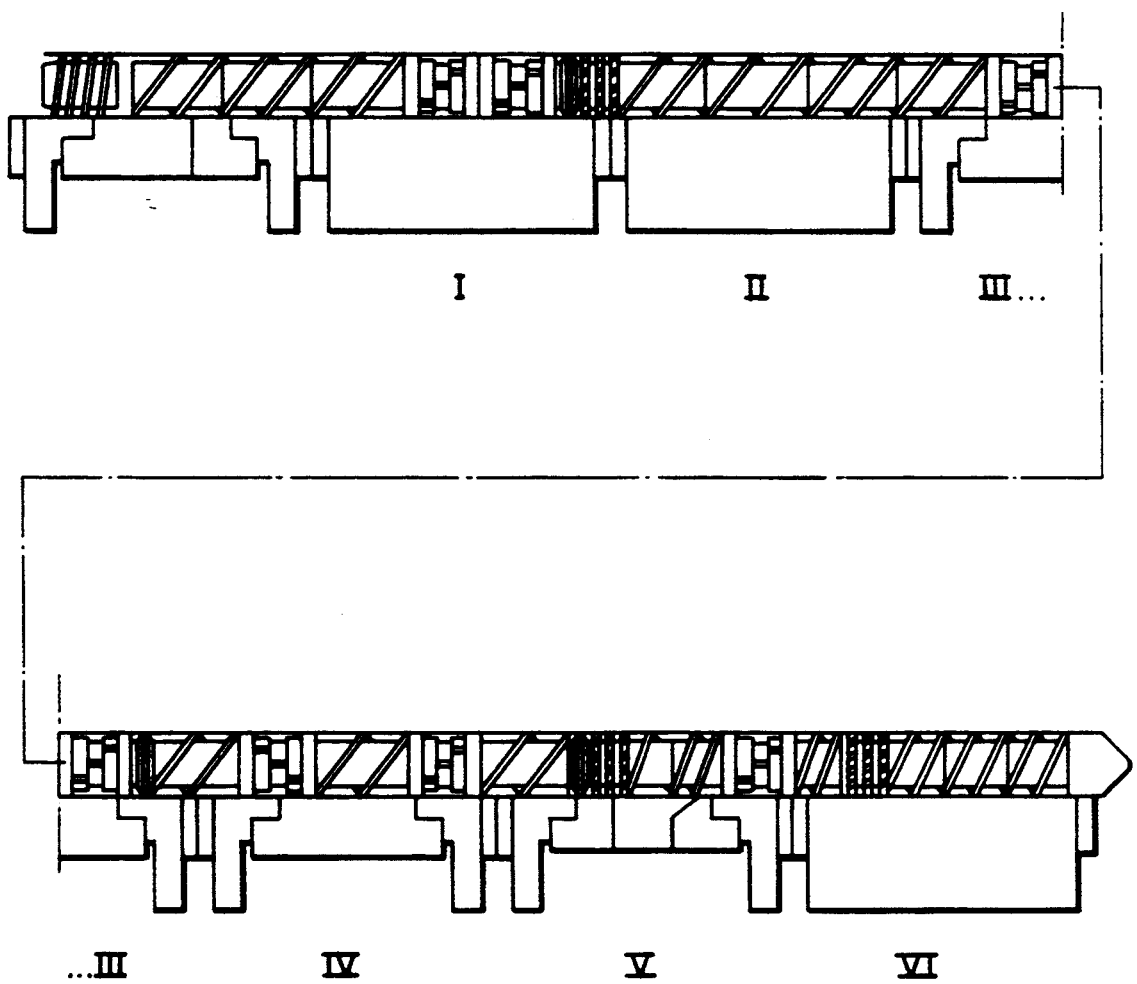
FIG. 5 illustrates an exemplary screw profile.

With reference now to FIG. 5, a specific embodiment of a screw profile useful in the method of the invention is illustrated.

For convenience, as used herein, screw extruder elements will be illustrated with the following designations:

D represents a drive end spacer.
H represents a helical screw element.
B represents a blister.
E represents a helical element that prevents backup of material at the feed end.
S represents a spacer.
K represents a high shear dispersive mixing (kneading) element.
G refers to a toothed mixing element.

A number preceding any of these designations indicates that there is that number of such elements in sequence. The number following these designations indicates the length of each piece in millimeters.

L represents left-handed (counterclockwise) advancement while R represents right handed (clockwise) advancement.

Double refers to double flights.

Also provided is a reinforced elastomer composite, made according to the method of the invention, having low hysteresis, high modulus and increased hardness as compared to a control made without such reinforcement and a control made using preformed polymer reinforcement.

Exemplary of the invention, it has been found that aromatic polyurea and polyurethane reinforcement produces a particularly strong elastomer composite.

One of the illustrated composites was prepared using polyurea precursors comprising 1,6-hexanediamine (HMDA) and methylene-bis-phenylisocyanate. The modulus and hardness of the composite increases with increased polyurea concentration and may be related to the morphology achieved. Also, processing conditions control, to a large extent, final material properties. Optimal reinforcement was obtained using a reaction temperature of about 140°-150° Celsius (289°-302° F.). For polyurea reinforcement, very little difference was noted for the timing and sequence of addition of precursors in the Brabender ® mixer or extruder although the diisocyanate was found less soluble in the rubber than the diamine and the sequential addition of diisocyanate and then diamine resulted in slightly smaller polyurea particles. However, the difference in particle size does not appear to affect the strength of the reinforcement.

Composites using polyurea reinforcement showed low hysteresis and good low strain modulus. The set was lower for the polyurea reinforced composite, and ultimate physical properties and critical tear energy (TC) were improved over the controls. Cut growth at 30% strain was markedly lower than that of an all-Natsyn control.

The morphology of the polyurea/Natsyn alloys was notably heterogeneous. Although a significant portion of the polyurea formed was small particles (less than 1 micron), there were numerous large agglomerates of polyurea reaching in excess of 25-30 microns. Accordingly, it is believed that the particle size of the reinforcing members may be controlled between about 1 micron and 30 microns depending on the purpose for which the composite is to be used.

The preparation of the polyureas was first demonstrated in solvent, and was subsequently demonstrated without solvent using the polymer matrix as the solvent. Using hexanediamine and isophoronediisocyanate to form an aliphatic polyurea, a comparison between solution and solid state preparation was made. Using tensile data, the solid state prepared material had slightly higher low strain modulus with lower ultimate tensile and elongation.

The invention is further illustrated with reference to the following examples.

EXAMPLES 1–16

The first evaluation of the polyurea/Natsyn alloys involved the preparation of aliphatic, aromatic and mixed polyureas. Natsyn is synthetic polyisoprene rubber. The diamine used was as a constant in these examples (1,6-hexanediamine was selected as the diamine). The diisocyanates selected included: methylene-bis-phenylisocyanate (aromatic), isophoronediisocyanate (aliphatic), and versions of both these diisocyanates that had been reacted at one isocyanate site with trimethylol-propane-monoallyl ether to produce a diisocyanate with a pendant allyl function, for potential sulfur curing. Structures of all the diamines and diisocyanates are given in Table I.

TABLE 1

Structures of Monomers Which Can Be Used To Form Reinforcing Polymers Elastomer

Diamine:
$H_2N-C_6H_{12}-NH_2$  Hexane Diamine (HDA)
$HO-C_6H_{12}-OH$  1,6-Hexanediol (HDO)

Diisocyanates:

A. $OCN-\phi-CH_2-\phi-NCO$  Methylene-bis-(phenyl isocyanate) (MDI)

B. Isophorone Diisocyanate (IPDI)

C. (IPDI-TMPMAE*)

D. (MDI-TMPMAE)

*TMPMAE - Diether of trimethylolpropane monoallyl ether

Synthesis of Diisocyanates C & D

The modified diisocyanates were prepared as follows: 1 equivalent of trimethylol-propane monoallyl ether was placed in a flask with X equivalents of the appropriate diisocyanate (X=3.9 for isophoronediisocyanate and 4.0 for methylene-bis(phenylisocyanate)). Dibutyl tin dilaurate was used as a catalyst. The mixture was stirred at room temperature overnight under nitrogen. The resulting diisocyanates were used without further modification.

Each of the polyurea/Natsyn combinations was prepared at 170° Celsius (338° F.) in a laboratory Brabender starting at 70 rpm. The rpm's were reduced during the preparation in order to control the temperature during mixing. No antioxidants or antidegradants were utilized during these mixing sequences, both to eliminate any side reactions and to allow elemental analysis after mixing was complete. For each diamine/diisocyanate combination, a series of three mixes was conducted wherein the polyurea level was varied from 10% to 30% by weight. After preparation, each material was characterized by DSC (differential scanning calorimeter) scan and Mooney viscosity (data in Table II).

TABLE II

Physical Characterization of Polyurea/Natsyn Materials

| Diisocyanate Used | % Polyurea | Tg (Deg C) (DSC) | ML 1 + 4 |
| --- | --- | --- | --- |
| B | 10 | −65.4 | 53.5 |
| B | 20 | −64.9 | 58.3 |
| B | 30 | −66.1 | 60.8 |
| C | 10 | −64.5 | 74.0 |
| C | 20 | −64.5 | 98.0 |
| C | 30 | −64.8 | 85.4 |
| A | 10 | −65.8 | 97.8 |
| A | 20 | −65.3 | 126 |
| A | 30 | −65.1 | 43.6(a) |
| D | 10 | −63.5 | 108.4 |
| D | 20 | −64.6 | 123.8 |
| D | 30 | −64.2 | 140.4 |
| Natsyn | — | −65.6 | 34.7 |

(a) Sample slipped in Mooney viscometer die cavity.

DCS scans revealed that the Natsyn Tg was not changed substantially for any of the combinations. Additionally, there was no melt observed for any of these polyureas up to 300° Celsius (572° F.). The Mooney viscosity of these alloys did reflect structural differences. The aliphatic polyureas had lower Mooney values than their aromatic counterparts and the polyureas with the pendant allyl groups were, for the most part, higher in Mooney viscosity.

These polyurea/Natsyn alloys were subsequently compounded in the model stock formulation described below for evaluation of physical properties.

Model Compounding Stock

| | | |
| --- | --- | --- |
| 100 | phr rubber | |
| 45 | phr carbon black | |
| 9 | phr processing oil | |
| 2 | phr antiozonant | Non-Productive |
| 2 | phr curing initiator | |
| 1 | phr antioxidant | |
| 1 | phr wax | |
| 3 | phr zinc oxide | |
| 1.6 | phr sulfur | Productive |
| 1.5 | phr primary accelerator | |
| 0.5 | phr secondary accelerator | |

The productive stock is the non-productive together with the productive ingredients.

Physical properties of a number of composites are illustrated in Tables III and IV.

TABLE III

Compounding of Aromatic Diisocyanate-Based Polyurea/Natsyn Samples

| | | 1 (a) | 2 | 3 | 4 | 5 | 6 | 7 | 8 | 9 | 10 |
| --- | --- | --- | --- | --- | --- | --- | --- | --- | --- | --- | --- |
| Isocyanate Monomer (See Table I) | | — | A | A | A | A | A | A | D | D | D |
| % Polyurea (b) | | 0 | 10 | 10 | 20 | 20 | 30 | 30 | 10 | 20 | 30 |
| Polyurea, PHR (c) | | — | 10 | 10 | 20 | 20 | 30 | 30 | 10 | 20 | 30 |
| Add-On or IPO (d) | | — | AO | IPO | AO | IPO | AO | IPO | AO | AO | AO |
| Rheometer, 150 C. | | | | | | | | | | | |
| dN-m | Max | 41.0 | 43.5 | 47.0 | 44.5 | 54.0 | 52.5 | 63.9 | 41.9 | 41.0 | 45.3 |
| | Rh | 32.7 | 33.8 | 37.0 | 30.5 | 36.7 | 31.2 | 35.9 | 32.7 | 29.9 | 28.0 |
| Min | t2 | 4.6 | 3.4 | 3.1 | 3.4 | 3.4 | 4.6 | 4.1 | 4.1 | 4.5 | 4.9 |
| | t25 | 5.3 | 4.6 | 4.3 | 4.7 | 3.9 | 5.1 | 4.4 | 4.4 | 4.9 | 5.4 |
| | t90 | 8.0 | 6.8 | 6.5 | 6.1 | 5.4 | 6.1 | 6.0 | 6.9 | 5.9 | 7.0 |
| Instron | | | | | | | | | | | |
| Modulus | 50% | 1.06 | 2.07 | 2.31 | 2.91 | 3.69 | 5.15 | 5.84 | 2.28 | 3.00 | 3.72 |
| (MPa) | 100% | 2.04 | 3.92 | 4.38 | 5.65 | 7.14 | 8.74 | 10.11 | 4.22 | 6.04 | 6.44 |
| | 300% | 10.3 | 17.2 | 17.2 | — | — | — | — | 16.9 | — | — |
| | UT | 32.6 | 25.7 | 23.6 | 15.8 | 17.4 | 12.2 | 12.7 | 25.6 | 22.7 | 11.3 |
| EB (%) | | 600 | 395 | 390 | 280 | 250 | 155 | 140 | 420 | 240 | 195 |
| Rheovibron | | | | | | | | | | | |
| Tan Delta, 0 C. | | .089 | .106 | .111 | .120 | .114 | .124 | .098 | .109 | .122 | .104 |
| Tan Delta, 60 C. | | .068 | .067 | .068 | .091 | .087 | .092 | .086 | .062 | .084 | .089 |

(a) Non-masticated Natsyn control.
(b) % Polyurea in Polyurea/Natsyn material used.
(c) Parts of polyurea in formulation.
(d) Add-on (AO) - plastic added to 100 phr Natsyn. IPO - Plastic replaces some Natsyn.

TABLE IV

Compounding Results for Aliphatic Diisocyanate-Based Polyurea/Natsyn Samples

|  |  | 1 (a) | 11 | 12 | 13 | 14 | 15 | 16 | 1(b) |
|---|---|---|---|---|---|---|---|---|---|
| Isocyanate Monomer (See Table I) | | — | B | B | B | C | C | C | — |
| % Polyurea (c) | | 0 | 10 | 20 | 30 | 10 | 20 | 30 | 0 |
| Polyurea, PHR | | — | 10 | 20 | 30 | 10 | 20 | 30 | — |
| Add-On or IPO (d) | | — | AO | AO | AO | AO | AO | AO | — |
| Rheometer, 150 C. | | | | | | | | | |
| dN-m | Max | 41.0 | 42.1 | 34.2 | 37.3 | 39.8 | 41.4 | 46.5 | 40.0 |
|  | Rh | 32.7 | 34.2 | 25.1 | 25.9 | 32.9 | 33.2 | 33.2 | 33.1 |
| Min | t2 | 4.6 | 3.2 | 5.9 | 5.8 | 4.4 | 4.6 | 4.2 | 4.1 |
|  | t25 | 5.3 | 4.9 | 9.1 | 10.5 | 5.0 | 5.2 | 4.9 | 4.5 |
|  | t90 | 8.0 | 7.6 | 12.1 | 14.8 | 7.8 | 7.6 | 6.9 | 5.9 |
| Instron | | | | | | | | | |
| Modulus | 50% | 1.06 | 1.54 | 1.43 | 1.94 | 1.36 | 2.02 | 3.03 | 1.00 |
| (MPa) | 100% | 2.04 | 2.96 | 2.44 | 3.66 | 2.62 | 4.23 | 5.98 | 1.90 |
|  | 300% | 10.3 | 13.6 | 10.5 | 10.6 | 13.5 | 15.5 | 11.7 | 9.2 |
|  | UT | 32.6 | 25.9 | 17.4 | 11.7 | 28.9 | 22.0 | 14.6 | 28.2 |
| EB (%) | | 600 | 470 | 450 | 335 | 525 | 405 | 265 | 575 |
| Rheovibron | | | | | | | | | |
| Tan Delta, 0 C. | | .089 | .095 | .127 | .116 | .106 | .114 | .116 | .109 |
| Tan Delta, 60 C. | | .068 | .068 | .106 | .119 | .066 | .083 | .100 | .071 |

(a) Non-masticated Natsyn control.
(b) Masticated Natsyn control.
(c) % Polyurea in Polyurea/Natsyn material used.
(d) Add-on (AO) - plastic added to 100 phr Natsyn. IPO - Plastic replaces some Natsyn.

On the basis of the data (Tables III and IV), several general conclusions were drawn: (1) the aromatic polyureas produced higher low strain moduli than their aliphatic counterparts, (2) the allyl-ether derivatives did not produce higher moduli, suggesting that the allyl groups did not cure into the polyisoprene network and/or the ether function used to link the two diisocyanates allowed the polyurea to become more flexible and therefore, less reinforcing, (3) increasing the level of and preformed polyurea added to the model stocks. As seen in Table V, in each case, the low strain modulus of the preformed polyurea stock was lower than the in-situ processed stock. Additionally, the ultimate tensiles were lower for the preformed polyurea-containing stocks. The data indicates that the reinforcement of in-situ polymerized polyurea is significantly better than the reinforcement provided by preformed polyurea reinforcement.

TABLE V

Compounding Comparison of In-Situ Polyurea/Natsyn To Added Polyurea

|  |  | 17(a) | 18 | 19 | 20 | 21 | 22 | 23 | 24 | 25 | 26 |
|---|---|---|---|---|---|---|---|---|---|---|---|
| Isocyanate Monomer | | — | A | A | A | A | B | B | B | B | B |
| Polyurea Form (b) | | — | 1 | 2 | 1 | 2 | 1 | 2 | 1 | 2 | 2 |
| Polyurea, PHR (c) | | — | 10 | 10 | 20 | 20 | 10 | 10 | 20 | 20 | 10 |
| Add-On or IPO (d) | | — | AO | AO | AO | AO | AO | AO | AO | AO | IPO |
| Rheometer, 150 C. | | | | | | | | | | | |
| dN-m | Max | 39.8 | 43.5 | 42.0 | 44.5 | 43.3 | 42.1 | 42.0 | 34.2 | 42.5 | 44.2 |
|  | Rh | 31.4 | 33.8 | 31.3 | 30.5 | 32.5 | 34.2 | 32.7 | 25.1 | 30.0 | 33.8 |
| Min | t2 | 3.9 | 3.4 | 3.6 | 3.4 | 4.3 | 3.2 | 3.7 | 5.9 | 3.9 | 3.4 |
|  | t25 | 4.4 | 4.6 | 4.3 | 4.7 | 4.7 | 4.9 | 4.3 | 9.1 | 4.4 | 4.1 |
|  | t90 | 7.4 | 6.8 | 7.1 | 6.1 | 7.6 | 7.6 | 6.9 | 12.1 | 6.9 | 6.9 |
| Instron | | | | | | | | | | | |
| Modulus | 50% | 1.14 | 2.07 | 1.34 | 2.91 | 1.15 | 1.54 | 1.35 | 1.43 | 1.48 | 1.35 |
| (MPa) | 100% | 2.23 | 3.92 | 2.27 | 5.65 | 1.77 | 2.96 | 2.39 | 2.44 | 2.92 | 2.30 |
|  | 300% | 11.12 | 17.2 | 9.2 | — | 8.28 | 13.6 | 10.4 | 10.5 | 10.7 | 9.86 |
|  | UT | 27.6 | 25.7 | 18.5 | 15.8 | 15.7 | 25.9 | 18.1 | 17.4 | 15.3 | 18.6 |
| EB (%) | | 530 | 395 | 475 | 280 | 450 | 470 | 430 | 450 | 400 | 455 |
| Rheovibron | | | | | | | | | | | |
| Tan Delta, 0 C. | | .098 | .106 | .102 | .120 | .111 | .095 | .104 | .127 | .113 | .106 |
| Tan Delta, 60 C. | | .056 | .067 | .062 | .091 | .064 | .068 | .061 | .106 | .062 | .064 |

(a) Non-masticated Natsyn control.
(b) 1- in-situ; 2 - preformed + added.
(c) Parts of polyurea in formulation.
(d) Add-On (AO) - plastic added to 100 phr Natsyn. IPO - Plastic in place of some Natsyn.

polyurea increased both the low strain modulus and the tan delta values at both 0° and 60° Celsius (32° and 140° F.) and (4) increasing the polyurea content decreased the ultimate tensile and elongation, as is typical for thermoplastic/elastomer alloys.

EXAMPLES 17–26

An additional comparison was made between tile in-situ, reactively processed polyurea/Natsyn alloys

EXAMPLES 27–31

A series of materials was prepared for further testing. Composites containing 30% by weight reinforcing material were prepared because of the excellent reinforcing potential. Because of the higher polyurea content in the material, less Natsyn was used. After compounding these materials in the model stocks, the stocks were evaluated for tensile/elongation, and tan delta (0° and 60° Celsius). (Table VI).

The aromatic polyurea alloy (sample #28) had the best reinforcing properties. The ultimate tensile and elongation values for the polymers were lower than the values demonstrated by the control.

TABLE VI

| Compounding Comparison of Various Polyurea/Natsyn Material | | | | | | |
|---|---|---|---|---|---|---|
| | | 27(a) | 28 | 29 | 30 | 31 |
| Isocyanate Monomer (b) | | — | A | B | C | D |
| Reinforcer, PHR | | 0 | 13 | 13 | 13 | 13 |
| Rheometer, 150 C. | | | | | | |
| dN-m | Max | 39.9 | 46.5 | 41.0 | 42.2 | 42.9 |
| | Rh | 29.7 | 33.1 | 30.2 | 31.1 | 30.6 |
| Min | t2 | 3.8 | 3.5 | 3.9 | 3.7 | 3.6 |
| | t25 | 4.4 | 3.9 | 4.6 | 4.2 | 4.1 |
| | t90 | 7.4 | 6.7 | 7.7 | 7.1 | 6.8 |
| Instron | | | | | | |
| Modulus | 50% | 1.18 | 2.42 | 1.73 | 1.76 | 2.06 |
| (Mpa) | 100% | 2.20 | 4.89 | 3.25 | 3.72 | 4.18 |
| | 300% | 10.1 | 15.5 | 12.8 | 13.8 | 13.9 |
| | UT | 29.4 | 20.1 | 23.6 | 22.4 | 17.8 |
| EB (%) | | 565 | 365 | 470 | 430 | 365 |
| Rheovibron | | | | | | |
| Tan Delta, 0 C. | | .089 | .098 | .098 | .092 | .102 | .091 |
| Tan Delta, 60 C. | | .061 | .087 | .060 | .064 | .066 | .059 |

(a) Non-masticated Natsyn control.
(b) All Polyurea/Natsyn's at 30% Polyurea.

The alloys were tested to determine the completeness of the reaction between the diamines and the diisocyanates. The results of the analysis are described in Table VII.

TABLE VII

| Elemental Analysis of Polyurea/Natsyn Samples from Research Extruder (% Nitrogen) | | | |
|---|---|---|---|
| | 27 | 28 | 29 |
| % Polyurea | 20 | 30 | 30 |
| 1st Component (b) | DA | DA | DI |
| Nitrogen Analysis | | | |
| Calc (c) | 3.06 | 4.59 | 4.59 |
| Unextracted (d) | 3.11 | 4.59 | 4.61 |
| Extracted (e) | 3.12 | 4.53 | 4.66 |

(a) Instrument precision ±0.04%.
(b) Component: DA - diamine DI - diisocyanate
(c) Calculated based on amounts of diamine and diisocyanate added during extrusion.
(d) As produced from extruder.
(e) Extracted 16 hrs with acetone, vacuum dried 5 hrs.

An optimal polyurea, based on the previous data, is a polyurea reinforcement formed by combining 1,6-hexanediamine and methylene-bis-phenylisocyanate. These precursors were used in the same ratios throughout in the following examples unless otherwise specified.

All materials used in the preparation of polyureas-/elastomer composites were used as received.

EXAMPLES 32-39

Polyurea/Natsyn Alloying in the Brabender

Laboratory preparation of polyurea/Natsyn alloys was conducted using an electrically heated Brabender. In each case, the Brabender was set to heat at a temperature 20° Celsius (68° F.) below the desired maximum mixing temperature.

Pre-weighed Natsyn was placed in the Brabender which was operated initially at 70 RPM. (The RPM was later used to control the maximum temperature reached during mixing.) Either the diamine or diisocyanate was measured in a syringe for injection in the mixing chamber. (In the case of 1,6-hexanediamine, the material was warmed above the melt point of 40° Celsius (104° F.) to facilitate using a syringe for injection.) As the rubber was mixed, a 5 ml injection of monomer was made in the chamber and the ram was closed. After addition of the monomer, the torque of the mixer fell off due to temporary lubrication by the monomer. Once the monomer was absorbed by the polymer, the torque increased. After all the first monomer was added, the second monomer was added in much the same manner. On addition of the second monomer, there was usually very little drop in torque due to lubrication. To the contrary, there was usually an increase in mixing torque upon formation of polyurea.

Once reactants had been added, the mixture was mixed only until no significant change in torque was noticed. The mixing was terminated at that point and the polymer removed from the mixing chamber. After cooling to room temperature, the material was ready for subsequent testing and evaluation.

The resulting alloys were compounded in the model stock and tested. Results given in Table VIII lead to the following conclusions: (1) the interval between addition of aliquots had little effect on physical properties, and (2) addition of the diisocyanate first yielded an alloy with slightly higher low strain modulus (#33 vs. #39), and (3) although the differences were not large, with regard to reinforcing properties there was an optimal temperature of mixing at about 140° Celsius (284° F.). At 120° and 130° Celsius (248° and 266° F.), polyurea coating of the mixer's rotor and walls was greatly reduced. This suggests that mixing at lower temperatures provides good reinforcing properties while improving mixing. Since the level of dispersion apparently affects the ultimate physical properties, the solubilities of the monomers is very important. There appears to be an optimum temperature for solubility of the polyurea ingredients in the rubber and the diamine appears to be more soluble in the elastomer than the diisocyanate.

TABLE VIII

| | 32 (d) | 33 | 34 | 35 | 36 | 37 | 38 | 39 |
|---|---|---|---|---|---|---|---|---|
| Reaction Temp (Deg C.) | | 170 | 170 | 170 | 170 | 120 | 140 | 170 |

TABLE VIII-continued

|  |  | 32 (d) | 33 | 34 | 35 | 36 | 37 | 38 | 39 |
|---|---|---|---|---|---|---|---|---|---|
| 1st Component (b) | | — | DA | DA | DA | DA | DA | DA | DI |
| 20 Sec Intervals (c) | | — | B | DI | DA | — | B | B | B |
| Mixing Time (min) | | — | 13 | 10 | 8 | 5 | 13 | 11 | 13 |
| Product Mooney ML 1 + 4 | | — | 164 | 164 | 145 | 147 | 137 | 156 | 121 |
| Rheometer, 150 C (e) | | | | | | | | | |
| dN-m | Max | 41.3 | 45.6 | 44.8 | 45.1 | 44.4 | 45.3 | 45.3 | 47.0 |
|  | Rh | 31.9 | 35.1 | 33.6 | 33.7 | 34.0 | 32.9 | 33.0 | 35.8 |
| Min | t2 | 4.3 | 3.6 | 4.0 | 4.4 | 4.4 | 3.9 | 4.1 | 3.9 |
|  | t25 | 5.2 | 4.6 | 4.9 | 5.5 | 5.4 | 4.9 | 5.0 | 5.0 |
|  | t90 | 8.4 | 7.4 | 7.8 | 8.2 | 8.4 | 7.8 | 7.8 | 7.8 |
| Instron (e) | | | | | | | | | |
| Modulus | 50% | 1.1 | 1.5 | 2.1 | 1.9 | 2.0 | 2.2 | 2.4 | 2.3 |
| (MPa) | 100% | 2.1 | 3.2 | 3.9 | 3.7 | 4.3 | 4.4 | 4.7 | 4.9 |
|  | 300% | 10.6 | 15.5 | 15.4 | 14.6 | 15.8 | 14.4 | 15.1 | 16.1 |
|  | UT | 30.2 | 24.3 | 24.6 | 21.3 | 23.8 | 22.6 | 22.9 | 19.6 |
| EB (%) | | 560 | 445 | 430 | 410 | 420 | 445 | 420 | 365 |
| Rheovibron (e) | | | | | | | | | |
| Tan Delta, 0 C. | | .097 | .109 | .106 | .101 | .106 | .108 | .106 | .114 |
| Tan Delta, 60 C. | | .059 | .071 | .069 | .064 | .068 | .069 | .066 | .072 |

(a) 30% Polyurea in Natsyn; mixed in Brabender mixer; Polyurea Components added in aliquots (5 mL each) with or without intervals between torque recovery from slippage and aliquot addition; diisocyanate - A.
(b) Component added 1st - DA - diamine, DI - diisocyanate.
(c) Component added with 20 sec interval included: DA - diamine, DI - diisocyanate, B - both.
(d) Non-masticated Natsyn control.
(e) Compounded at 13 PHR polyurea added on Natsyn.

Figure 6:
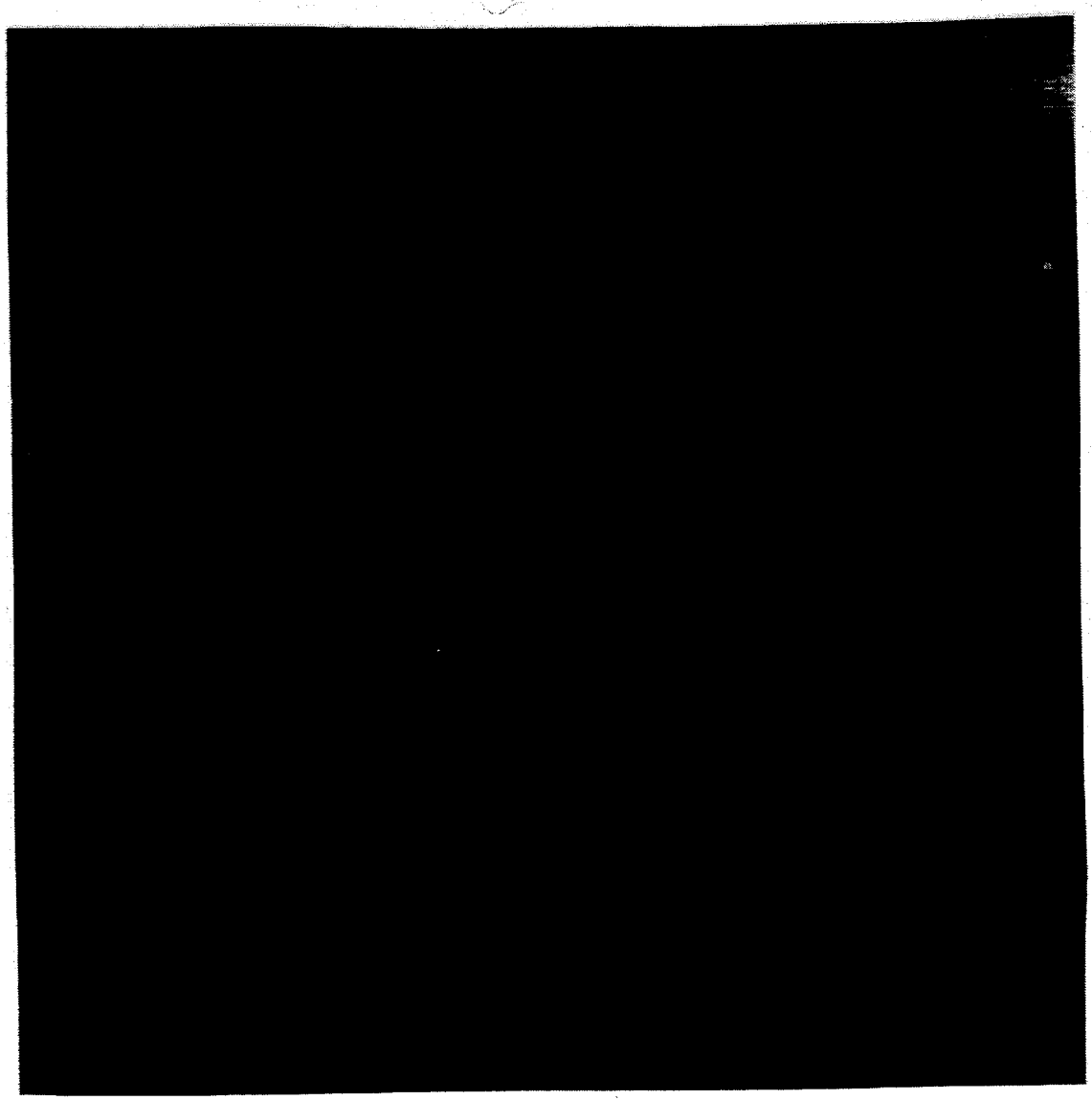
FIG. 6 illustrates the orientation of 30% polyurea in Natsyn prepared in a Brabender at 170° Celsius (338° F.).
Figure 7:
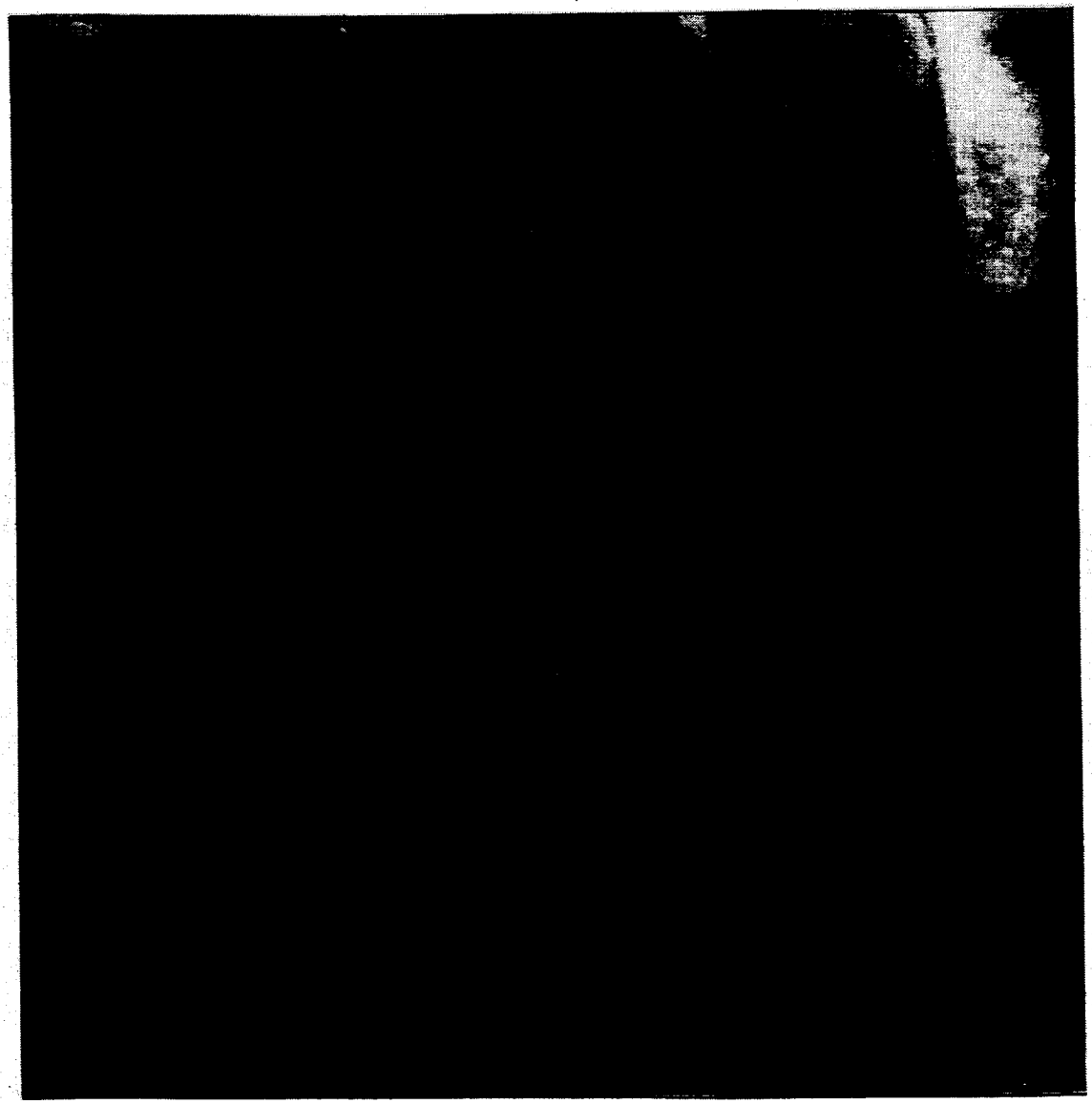
FIG. 7 illustrates the orientation of 30% polyurea in Natsyn prepared in a Brabender at 120° Celsius (248° F.).
Figure 8:
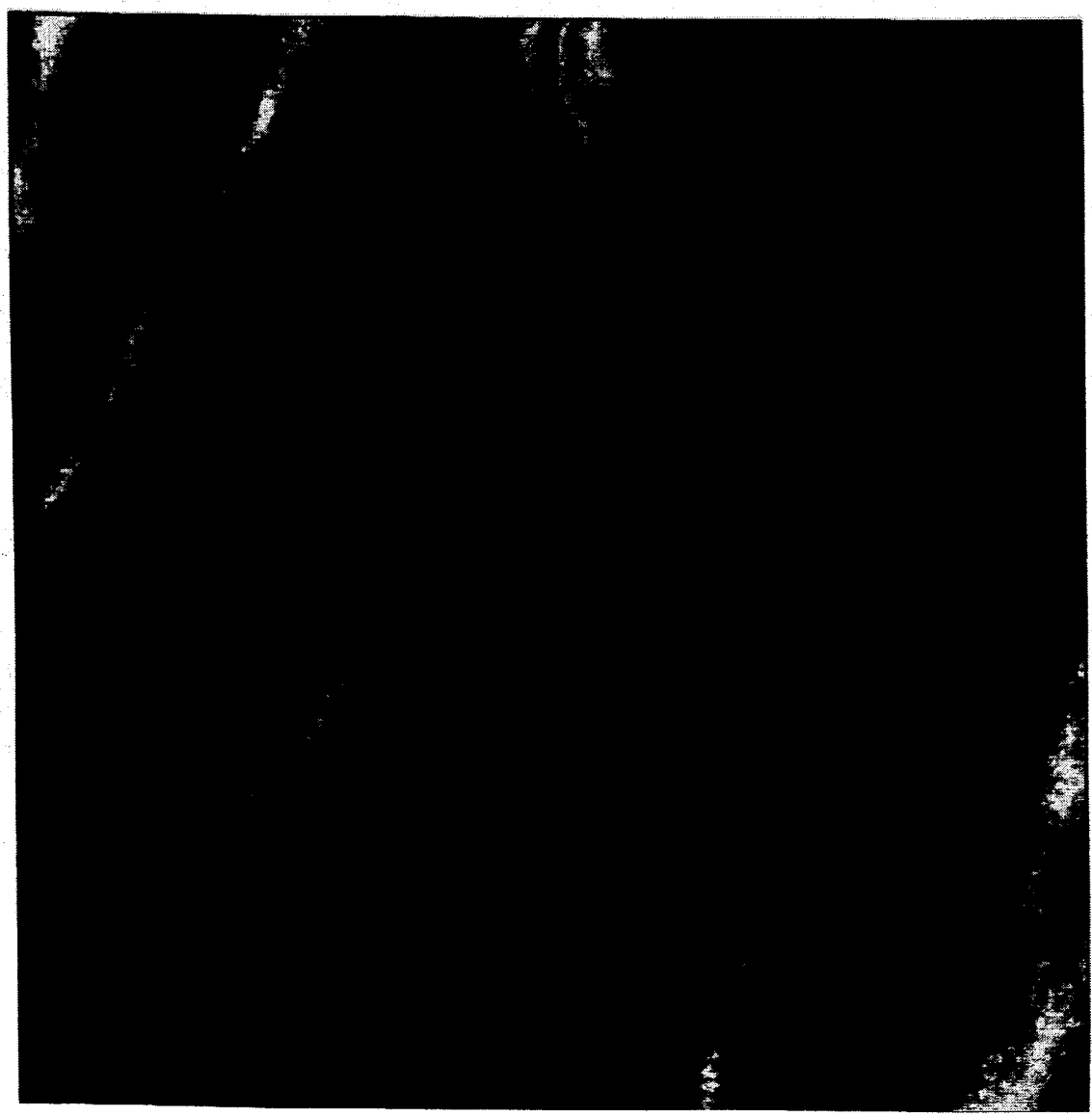
FIG. 8 illustrates the orientation of 30% polyurea in Natsyn prepared in a Brabender at 140° Celsius (284° F.).

Transmission electron micrographs (TEM) were taken of several of the polyurea composites prepared. FIG. 6 shows the morphology of the polyurea alloy of sample 33, which was prepared at 170° C. (338° F.). Although there are many very fine particles of polyurea formed, there are also domains of considerably larger size. The range in particle size is from the 0.1 micron size particles up to 15–25 micron "agglomerates". FIG. 7 is an illustration of a micrograph of sample 37, prepared at 120° Celsius (248° F.). Here the number of small particles (less than 1 micron) is much lower and the large, stringy agglomerate particles are more prominent. (Mixing was difficult for this material.) FIG. 8 shows sample 38, prepared the same way except that the mixing temperature was 140° Celsius (284° F.). This sample has much more of the material as sub-micron particles and less of the agglomerated material.

Because there is a difference between the solubilities of diamine and diisocyanate in the rubber matrix, the order of addition has an affect on the resulting morphology of the reinforced elastomer. The very fast reaction of the two components reduces the mixing time available for the second compound added.

The Diamine appears to be more soluble than the diisocyanate in the rubber matrix. When the diamine is added first, upon addition of the diisocyanates the reaction takes place faster than any significant mixing of the diisocyanate, resulting in some large agglomerates being formed. However, if the diisocyanate is mixed first, the addition of the diamine allows better mixing before the reaction freezes the morphology, and a finer, more evenly dispersed morphology results.

Figure 9:
FIG. 9 illustrates the orientation of 30% polyurea in Natsyn prepared in a Brabender at 170° Celsius (338° F.), wherein diisocyandte was added first.

FIG. 9 illustrates the morphology of an alloy in which diisocyanate was added first.

EXAMPLES 40–43

Polyurea/Natsyn Alloying in a Laboratory Reactive Processing Extruder

A research reactive processing extruder was used to produce polyurea/Natsyn alloys by introducing the Natsyn into the first segment of the extruder via a calibrated loss-in-weight feeder. (The Natsyn had been previously ground and partitioned with a fine silica.) The monomers were introduced through feed lines attached to segments further down the screw barrel. In the case of diamine-first feeding, the diamine was introduced in the second segment and diisocyanate in the third. For diisocyanate first feeding, diisocyanate was introduced in the second segment and diamine in the fourth.

The data obtained from the compounding experiments were referred to for setting up parameters for the processing extruder and several samples of the alloy having the best properties were prepared in the processing extruder. The reaction temperature was selected to be about 140° Celsius (284° F.) based on the previous data. Three variations of polyurea/Natsyn were prepared: (1) 20% polyurea with diamine added first, (2) 30% polyurea with diamine added first and (3) 30% polyurea with diisocyanate added first.

Polyurea was formed in situ in a polyisoprene elastomeric matrix by the continuous mixing and reaction of 1,6-hexanediamine (HMDA) and methylene-bis-phenylisocyanate (MDI) in a co-rotating, intermeshing, twin-screw extruder. The screw elements (FIGS. 1, 2, 3, and 4 were assembled as per the configuration below:

| | |
|---|---|
| 1 D 10 | 1 S 1.75 |
| 1 E 40 | 1 G 30 |
| 3 H 40 | 3 G 10 |
| 1 S 1.75 | 1 H 40 |
| 1 K 50-L | 1 S 1.75 |
| 1 S 1.75 | 1 K 50-L |
| 1 H 40 double | 1 S 1.75 |
| 1 S 1.75 | 1 H 60 double |
| 4 (K9 + S1.75)-L | 1 S 1.75 |
| 1 B 40 | 6 G 10 |
| 1 S 1.75 | 1 S 1.75 |
| 2 G 30 | 1 H 60 double |

-continued

```
1 S 1.75              5 G 10
1 H 40                1 H 40
1 S 1.75              1 S 1.75
3 (K9 + S1.75)-L      1 K 50-L
1 H 40                1 S 1.75
1 S 1.75              1 H 40
2 G 30                1 S 1.75
1 H 40                1 K 50-L
1 S 1.75              1 S 1.75
6 (K9 + S1.75)-L      1 H 60 double
1 H 40                1 H 40 double
```

The extruder screws had an outer diameter of 43 mm and the total length of the extruder was 1380 mm. It was driven by a 30 kw variable speed A/C motor. The extruder was also equipped with multiple injection ports through which the liquid reactants could be pumped into the barrel. Electrical heating elements were mounted on the extruder barrel segments. Provision was made to circulate cooling water through jackets mounted on the barrel segments. This heating and cooling arrangement enabled good control over the operating temperature.

To produce compounds 41 and 42 (Table IX), the polyisoprene was fed continuously into the extruder feed hopper by a precise loss-in-weight type screw feeder. The HMDA was continuously pumped by a diaphragm pump into the extruder 243 mm after the isoprene was fed into the extruder. The flow rate was continuously measured and the speed of the pump adjusted by a feedback control loop to give a precise HMDA flow. The MIDI was injected into the extruder 418 mm after the polyisoprene was fed into the extruder. As with the HMDA, the flow rate of MDI was measured and controlled. Barrel segments I, II, IV and V were heated to 135° C. (275° F.) and barrel segments II and VI were held at 121° C. (250° F.). A strand die (5 holes of 3.2 mm diameter each) was mounted at the exit of the extruder. The product strands were quenched in a water trough, air dried, pelletized and collected.

To provide compound 41, the method described above was used with the proportions of MDI and HMDA set to yield 20% by weight of polyurea in polyisoprene. The feed rate of polyisoprene was 16 lbs/hr, that of HMDA was 10.15 ml/min and that of MDI was 17.75 ml/min to yield a total of 20 lbs/hr. The power consumption was 2 kw at 40 rpm. The residence time was about 4 minutes, and the extrudate was at 185° C. (365° F.).

To produce compound 42, the polyisoprene was fed into the extruder at a rate of 14 lbs/hr, the HMDA at 15.17 ml/min, and the MDI at 26.54 ml/min to give a total of 20 lbs/hr of product. The extruder consumed 2.2 kw at 40 rpm. This yielded a product (compound 42) with 30% by weight of polyurea in polyisoprene. The residence time was about 4 minutes, and the extrudate temperature was 182° C. (360° F.).

To produce compound 43, the method was repeated, except that MIDI was added at a location 418 mm downstream after addition of the polyisoprene and HMDA was added at a location 618 mm after addition of the polyisoprene. The total rate was 20 lbs/hr with a polyisoprene feed rate of 14 lbs/hr, a HMDA feed rate 15.08 ml/min, and a MDI feed rate of 25.32 ml/min. Barrel segments I, II and V were at 135° C. (275° F.), and segments III, IV and VI were at 121° C. (250° F.). The residence time was about 4 minutes, and the extrudate was at 182° C. (360° F.). The extrudate consumed 2.2 kw at 40 rpm.

Compounding

Mixing of test formulations was performed either on a 56 g Brabender or a BR Banbury.

The three extruder-prepared polyurea alloys were compounded in the model compound for evaluation (Table IX). The results show almost no significant difference in properties, except when the lower concentration of polyurea was used. The level of low strain reinforcement produced by these products was the same as that observed for the Brabender prepared materials.

TABLE IX

Compounding and Analysis of Polyurea/Natsyn Produced on the Research Extruder (a)

|  |  | 40 (b) | 41 | 42 | 43 |
|---|---|---|---|---|---|
| % (PHR) Polyurea (c) |  | — | 20 (25) | 30 (43) | 30 (43) |
| Monomer First (d) |  | — | DA | DA | DI |
| Rheometer, 150° C. |  |  |  |  |  |
| dN-m | Max | 43.8 | 46.5 | 48.6 | 49.4 |
|  | Rh | 34.1 | 33.7 | 35.1 | 36.5 |
| Min | t2 | 3.6 | 2.8 | 2.7 | 2.6 |
|  | t25 | 4.6 | 3.9 | 3.6 | 3.6 |
|  | t90 | 7.9 | 6.7 | 6.4 | 6.4 |
| Instron |  |  |  |  |  |
| Modulus | 50% | 1.2 | 2.1 | 2.6 | 2.7 |
| (MPa) | 100% | 2.4 | 4.0 | 4.9 | 4.9 |
|  | 300% | 11.6 | 15.5 | 17.3 | 16.6 |
|  | UT | 29.5 | 21.9 | 23.6 | 22.7 |
| EB (%) |  | 530 | 390 | 390 | 390 |
| Tan Delta, 0° C. |  | .081 | .104 | .109 | .104 |
| Tan Delta, 60° C. |  | .054 | .061 | .065 | .063 |

(a) All samples produced at 150° C. using hexanediamine and diisocyanate A; compounded at polyarea level of alloy.
(b) Non-masticated Natsyn control.
(c) % - Polyurea content of polyurea/Natsyn.
(d) DA - Diamine first; DI - diisocyanate first.

Figure 10:
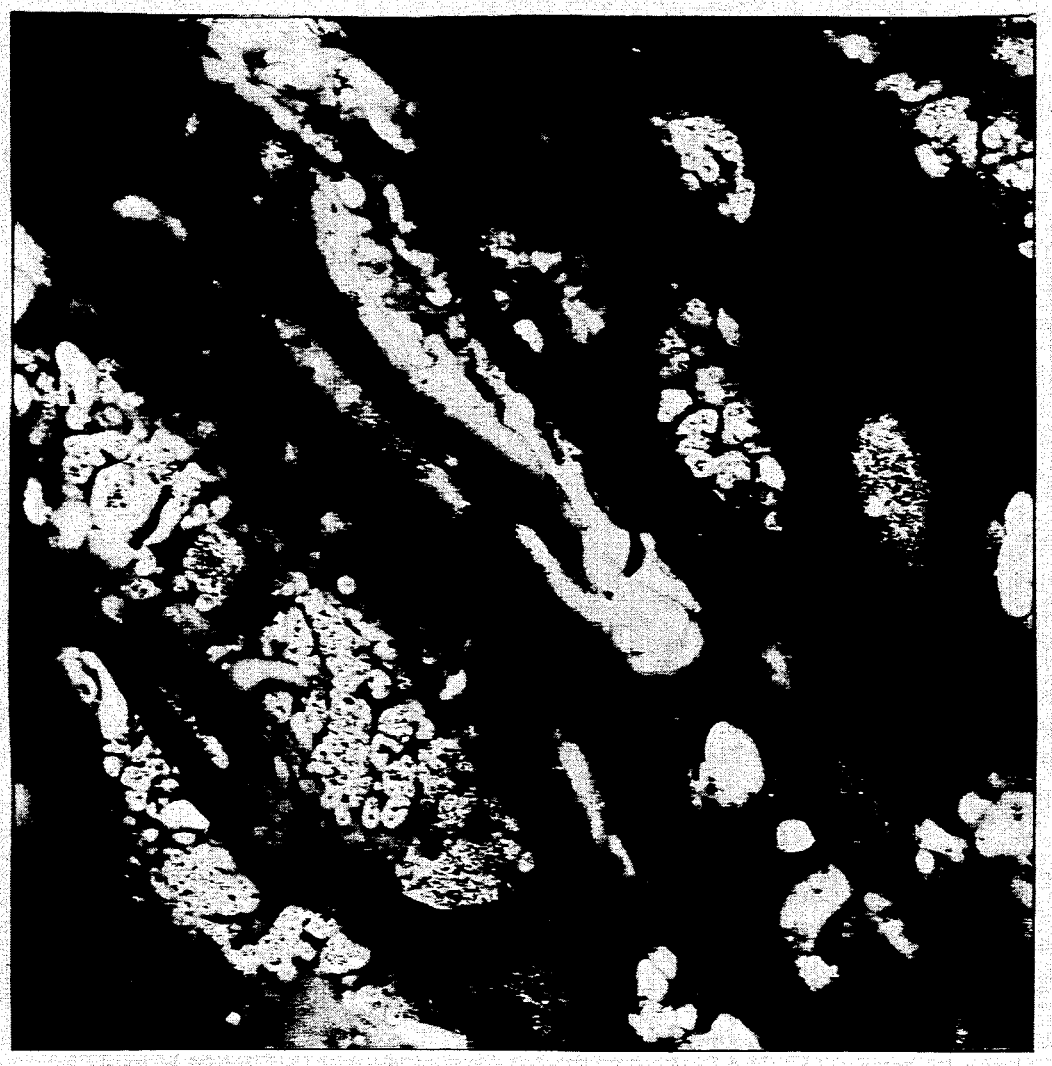
FIG. 10 illustrates 30% polyurea in Natsyn prepared in an extruder at 150° Celsius (302° F.).
Figure 11:
FIG. 11 illustrates 30% polyurea in Natsyn prepared in an extruder at 150° Celsius (302° F.), reversing the order of addition of polyurea precursors.

Two of the products were examined by transmission electron microscopy (FIGS. 10 and 11). 30% polyurea/Natsyn prepared with diamine added first shows a much larger particle size than that produced in the Brabender although still less than 1 micron. When diisocyanate is added first, the particle size is not as fine as that observed in samples made in the Brabender mixer. Obviously, the extruder with the screw configuration used in this example, does not disperse the first monomer finely enough to produce the same small particles observed in samples obtained from the Brabender. This may be attributed to the short residence time in the extruder prior to addition of the second monomer. Although there was a small difference in particle size, no substantial difference in reinforcement was observed.

EXAMPLES 44-50

This Example illustrates incorporation of polyurethane reinforcement by forming polyurethane in-situ in an elastomer mixture.

In this Example two alcohol containing materials (Hycar ®—alcohol terminated polybutadiene—from Goodrich) and (HDO-1,6-hexanediol) were added to an elastomer mixture first, to get them well dispersed in the elastomer, and then the diisocyanate was added.

Reaction temperatures are given in Table X.
Reaction times were all approximately 8-11 minutes.
Otherwise preparation technique was similar to that for the polyurea's except that aliquots were not used. The ingredients were added as quickly as possible.

Compounding Results:

The polyurethane/Natsyn alloys all showed increases in reinforcement as witnessed by the increased low strain (50%) modulus as compared to the Natsyn control.

Ultimate tensiles/elongations reflected the typical response for reinforced materials, i.e. tensile strength/elongation decreased in both.

Higher reaction temperatures gave higher reinforcement—indicative of more complete reaction or higher molecular weight.

There was low, if any, effect on hysteresis in all the samples.

TABLE X

| Compounding Data for Polyurethane/Natsyn (a) (c) | | | | | | | |
|---|---|---|---|---|---|---|---|
| | | 44 (b) | 45 | 46 | 47 | 48 | 49 | 50 |
| Reaction Temp (Deg C.) | | — | 150 | 175 | 150 | 175 | 150 | 175 |
| Hycar | | — | — | — | 3.0 | 3.0 | 4.5 | 4.5 |
| HDO | | | 9.6 | 9.6 | 8.6 | 8.6 | 8.1 | 8.1 |
| MDI | | — | 20.4 | 20.4 | 18.4 | 18.4 | 17.4 | 17.4 |
| Rheometer, 150° C. (c) | | | | | | | | |
| dN-m | Max | 39.3 | 42.0 | 40.8 | 42.2 | 41.6 | 40.8 | 41.1 |
| | Rh | 31.3 | 33.5 | 32.8 | 33.4 | 33.0 | 32.5 | 32.9 |
| Min | t2 | 4.2 | 4.5 | 5.0 | 4.5 | 4.8 | 4.8 | 5.1 |
| | t25 | 5.2 | 5.7 | 6.4 | 5.7 | 5.9 | 5.9 | 6.3 |
| | t90 | 8.9 | 8.7 | 10.0 | 8.7 | 9.4 | 9.0 | 9.5 |
| Instron (c) Modulus | | | | | | | | |
| (MPa) | 50% | 1.13 | 1.55 | 1.71 | 1.63 | 1.71 | 1.65 | 1.85 |
| | 300% | 11.8 | 12.8 | 13.7 | 13.3 | 13.3 | 13.4 | 13.5 |
| | UT | 30.8 | 22.5 | 18.8 | 23.8 | 21.1 | 25.1 | 23.3 |
| EB (%) | | 540 | 435 | 380 | 455 | 420 | 465 | 450 |
| Rheovibron (c) | | | | | | | | |
| Tan Delta, 0° C. | | .109 | .116 | .120 | .118 | .115 | .116 | .109 |
| Tan Delta, 60° C. | | .068 | .067 | .175 | .071 | .074 | .071 | .068 |

(a) 23% polyurethane in Natsyn; Polyurethane components added all at once; Polyurethane components - Hycar - CT8 3100X31, HDO - Lexanedrol, MDI - methylene-p-phenylediisocyanate; addition order - Hycar, Hexanediol, MDI.
(b) Non-Masticated Natsyn control.
(c) Compounded at 15 phr polyurethane added on Natsyn.

While specific embodiments of the invention have been illustrated and described, those skilled in the art will recognize that the invention may be variously modified and practiced without departing from the spirit of the invention. The invention is limited only by the following claims.

What is claimed is:

1. A continuous method for the in-situ polymerization of plastic selected from the group consisting of polyaramide, polyamide, polyester, polyurethane, and polyuria in an elastomeric material selected from the group consisting of natural rubber, neoprene rubber, styrene-butadiene rubber, polybutadiene rubber, synthetic polyisoprene rubber, NBR (nitrile butadiene rubber), EPDM (ethylene propylene diene monomer) rubber, and mixtures thereof in a form suitable for reinforcing elastomeric material comprising the steps of:
   (a) feeding an elastomer and monomer precursors of said plastic into a twin screw extruder having an extruder screw and barrel sections configured into zones in which the elastomeric material and monomer are continuously fed and/or mixed, wherein said elastomer is fed into said extruder at a rate of 14–16 lbs/hr, and individual monomer precursors are added separately into the same or different mixing zones of said extruder,
   (b) mixing said elastomer and said monomer precursors vigorously in said extruder at a temperature of 100°–200° C. to provide a mixture of elastomeric material and monomers,
   (c) initiating polymerization of said monomer precursors during the mixing process, by continuously adding initiators to said mixture downstream of the initial mixing step,
   (d) controlling the temperature of the mix with reference to the materials used to form domains or fibrils of reinforcing materials having a length of 0.1 to 100 microns, and
   (e) mixing said mixture and initiators, whereby said monomer precursors continue to polymerize until the melting point of a polymer produced thereby exceeds the mixing temperature of the elastomer and solidifies to provide an elastomer containing 10 % to 30 % by weight reinforcing polymer.

2. The method of claim 1 comprising the step of creating four mixing zones comprising the following sequence of elements:

| | |
|---|---|
| 1 D 10 | 1 S 1.75 |
| 1 E 40 | 1 G 30 |
| 3 H 40 | 3 G 10 |
| 1 S 1.75 | 1 H 40 |
| 1 K 50-L | 1 S 1.75 |
| 1 S 1.75 | 1 K 50-L |
| 1 H 40 double | 1 S 1.75 |
| 1 S 1.75 | 1 H 60 double |
| 4 (K9 + S1.75)-L | 1 S 1.75 |
| 1 B 40 | 6 G 10 |
| 1 S 1.75 | 1 S 1.75 |
| 2 G 30 | 1 H 60 double |
| 1 S 1.75 | 5 G 10 |
| 1 H 40 | 1 H 40 |
| 1 S 1.75 | 1 S 1.75 |
| 3 (K9 + S1.75)-L | 1 K 50-L |
| 1 H 40 | 1 S 1.75 |
| 1 S 1.75 | 1 H 40 |
| 2 G 30 | 1 S 1.75 |
| 1 H 40 | 1 K 50-L |
| 1 S 1.75 | 1 S 1.75 |
| 6 (K9 + S1.75)-L | 1 H 60 double |
| 1 H 40 | 1 H 40 double | wherein D represents a drive end spacer,
H represents a helical screw element,
B represents a blister,
E represents a helical element that prevents backup of material at the feed end, S represents a spacer, K represents a high shear dispersive mixing (kneading) element, G refers to a toothed mixing element, and wherein a number preceding any of these designations indicates that there is that number of such elements in sequence, the number following these designations indicates the length of each piece in millimeters, L represents left-handed (counterclockwise) advancement while R represents right handed (clockwise) advancement, and Double refers to double flights.

3. The method of claim 2 wherein said elastomer is polyisoprene and said plastic precursor is HMDA (hexamethylene diamine) and MDI (diphenyl-methylene diisocyanate) and comprising the step of maintaining said mixing zone temperatures between 120°–170° Celsius.

4. The method of claim 1 further comprising the step of selecting said elastomer to be polyisoprene, and said plastic precursors to be diols and diisocyanates and further comprising the step of maintaining said mixing zone temperatures between 120°–170° Celsius.

5. The method of claim 1 further comprising the step of selecting said elastomer to be polyisoprene and said plastic precursors to be diols and diamines and further comprising the step of maintaining said mixing zone temperatures between 120°–170° Celsius.

6. The method of claim 1 further comprising the step of selecting said elastomer to be polyisoprene and said plastic precursors to be diacids and diamines and further comprising the step of maintaining said mixing zone temperatures between 120°–170° Celsius.

* * * * *